F. A. COTTIER, Jr.
STOVE OR HEATER.
APPLICATION FILED FEB. 5, 1917.
1,240,679.
Patented Sept. 18, 1917.
2 SHEETS—SHEET 2.
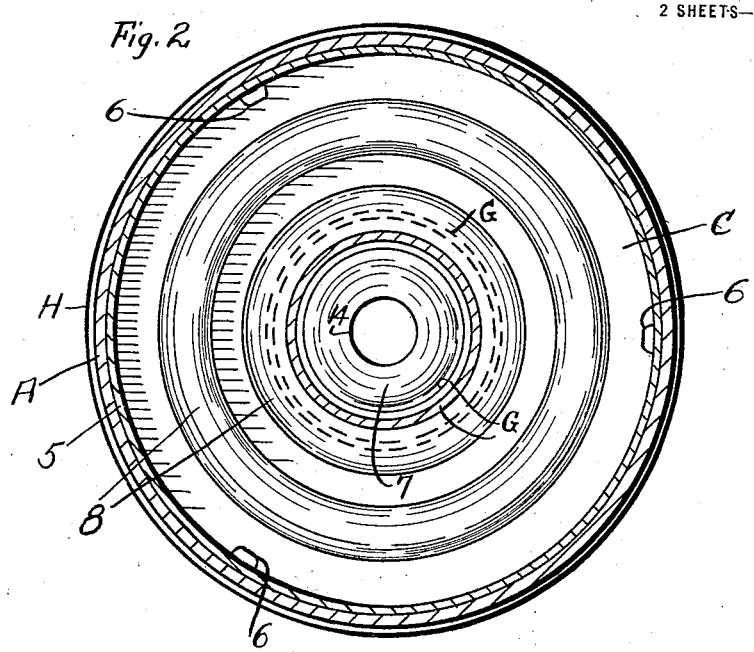
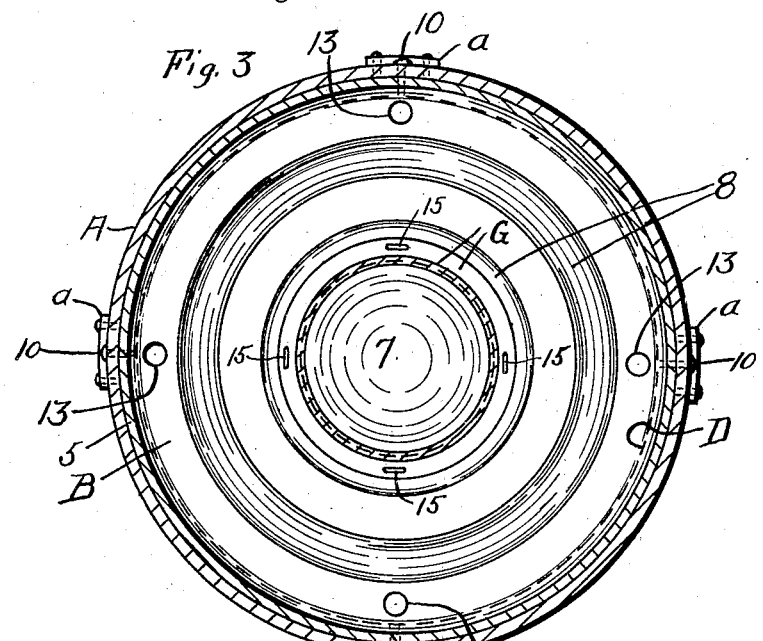
Witnesses.
Casper J. Dorr.
B. C. Brown.
Inventor.
Francis A. Cottier, Jr.
By Chas. H. Dorer
his Attorney.

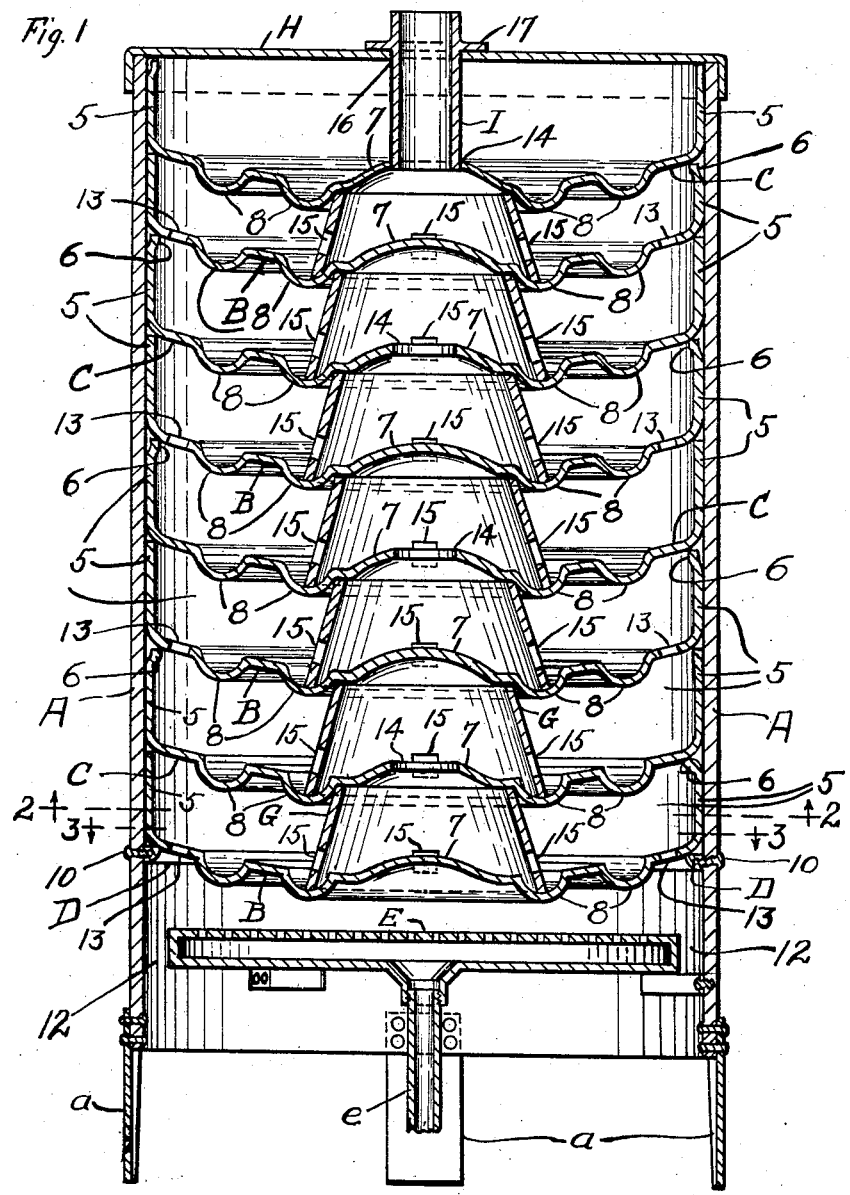

UNITED STATES PATENT OFFICE.

FRANCIS A. COTTIER, JR., OF CLEVELAND, OHIO.

STOVE OR HEATER.

1,240,679.     Specification of Letters Patent.     Patented Sept. 18, 1917.

Application filed February 5, 1917. Serial No. 146,627.

*To all whom it may concern:*

Be it known that I, FRANCIS A. COTTIER, Jr., a citizen of the United States of America, residing at Cleveland, in the county of Cuyahoga and State of Ohio, have invented certain new and useful Improvements in Stoves or Heaters; and I hereby declare the following to be a full, clear, and exact description of the invention, such as will enable others skilled in the art to which it pertains to make and use the same.

This invention relates to improvements in stoves or heaters, and pertains more especially to a gas heater comprising vertically spaced transverse partitions arranged internally of a metal casing and over a heating burner and participating in the formation of a sinuous passageway for the products of combustion arising from the burner during the operation of the burner.

One object of this invention is to minimize the waste of products of combustion, and to economize in the consumption of fuel.

Another object is to adequately retard the upward passage internally of the hereinbefore mentioned casing of the products of combustion and to most effectually utilize the hereinbefore mentioned partitions in transmitting heat to said casing.

Another object is to so construct the heater that it is easily cleanable and repairable and that the component parts thereof can be assembled with facility.

With these objects in view, and to the end of producing a heater which is simple, strong and durable in construction, this invention consists in certain structural features, and combinations and relative arrangement of parts, hereinafter described in this specification, pointed out in the claims, and illustrated in the accompanying drawings.

In said drawings, Figure 1 is a central vertical section of a heater embodying my invention. Fig. 2 is a transverse section taken along the line 2—2, Fig. 1, looking upwardly. Fig. 3 is a transverse section taken along the line 3—3, Fig. 1, looking downwardly.

Referring to said drawings, A indicates a vertically arranged or upright metal casing which is shown circular in cross-section. Within said casing are contained several vertically spaced deflector-forming partitions B and several deflector-forming partitions C alternating with the partitions B.

Each partition is arranged in a substantially horizontal plane and transversely of the heater. Each partition is shown circular to conform to the contour in cross-section of the casing A. Each partition is provided, next internally of the casing, with an upwardly projecting annular circumferential flange 5 substantially corresponding in external diameter with the internal diameter of the casing. The flanges 5 of the partitions are preferably provided at their upper end with an inwardly projecting member 6, and the upper partition of adjacent partitions is removably seated on the upper end of the flange 5 of the lower of said adjacent partitions, and said flange spaces apart the body-portions of said adjacent partitions. Preferably each partition has a somewhat upwardly bulging central portion 7 and is provided between said central portion and the flange 5 of the partition with two spaced annular downwardly offset portions 8 arranged concentrically relati e to the said central portion and concentrically relative to said flange and the surrounding casing.

The lowermost partition rests on a metal ring D snugly fitting internally of the casing A and shown removably secured, by means of screws 10, to the casing. Therefore, as the upper of adjacent partitions is mounted on the flange 5 of the lower of said partitions and the lowermost partition is mounted on the ring D supported from the casing, all of the partitions are supported from the casing.

It will be observed that partitions shaped or contoured as hereinbefore described are easily introduced into the casing from the upper end of the casing and readily removed from the casing.

Under the lowermost partition is arranged a heating burner E which is supported from the casing in any approved manner and in communication with a pipe *e* for supplying fluid fuel, such, for instance, as a mixture of natural gas and air to the burner. The burner is of course spaced downwardly from the lowermost partition, and the chamber 12 formed internally of the lower end-portion of the casing and containing the burner is in open relation at the lower end of the casing with the atmosphere externally of the casing.

The lowermost partition is one of the series of partitions B, and each partition B has its central upwardly offset portion 7 imperforate and is provided between its outer annular downwardly offset portion 8 and its flange 5 with perforations 13 spaced circumferentially of said offset portion.

The series of partitions C includes the uppermost partition, and each partition C is provided centrally of its upwardly offset central portion 7 with an opening 14. Preferably the inner annular downwardly offset portion 8 of the lower of adjacent partitions forms a seat for the lower end of an upwardly tapering flue-forming tube G which is interposed between said partitions, and the inner annular downwardly offset portion 8 of the upper of said partitions embraces the upper end of said tube. Each tube G is provided in its lower portion with lateral perforations 15 spaced circumferentially of the tube. Obviously the tube G interposed between the central portions of adjacent partitions braces apart said partitions. The casing is shown provided, at its lower end, with feet $a$ adapted to rest on the floor of a room or apartment to be heated by my improved heater, and said casing is provided at its upper end with a cap or head H removably applied to the casing. The head H is provided centrally with an opening 16 through which extends a flue-forming tube I externally provided, at the top of the head, with a flange 17 seated on the head. The tube I extends above the flange 17 a suitable distance and may, if desired, be placed in communication in any approved manner with a flue in a chimney not shown. The tube I extends below the head H and into the central opening 14 in the upwardly offset central portion 7 of the uppermost partition. The lowermost partitions B and C preferably consist each of a metal casing, and the remaining partitions are preferably each composed of a metal stamping.

By the construction hereinbefore described it will be observed that the perforations 13 in each partition B establish communication adjacent the casing, between the space next below said partition and the space between said partition and the next upper partition C, and that the space between adjacent partitions and surrounding the tube G interposed between said partitions is in communication with said tube through the perforations 15 in the tube. It will be observed also that the opening 14 in each partition C establishes communication between the tube G next below said partition and the tube G next above said partition, and that the tube G interposed between the uppermost partition C and the next lower partition B communicates with the tube I. Hence a comparatively long sinuous passageway is formed between the burner and the tube I for the products of combustion arising from the burner during the operation of the burner, and the passage of said products of combustion upwardly in the heater is retarded to such an extent that their consumption within the heater is such that substantially no obnoxious gases and moisture escape at the tube I.

It will also be observed that the component parts of the heater are readily assembled, that any partition or internal tube of the heater can be quickly replaced when required, that the inner annular downwardly offset portions 8 of adjacent partitions center the tube G interposed between said partitions relative to said partitions and maintain said tube in a vertical position, that the upwardly bulging central portion 7 and the downwardly offset portions 8 of each partition materially participate in rendering said partition adequately strong and capable of retaining its shape and of efficiently and rapidly absorbing heat, and that the upward flare of each partition and the termination of said partition in the upwardly projecting annular flange next internally of the casing not only facilitate the introduction and accurate guiding of said partition into the casing during the assemblage of the parts but render the partition capable of rapidly and efficiently transmitting heat to the surrounding casing so as to rapidly and adequately heat air next externally of the casing.

What I claim is:—

1. In a heater, an upright metal casing, several vertically spaced suitably supported deflector-forming partitions arranged in a substantially horizontal plane internally of the casing and transversely of the heater, and a heating burner arranged under the lowermost partition, said partitions forming internally of the casing a sinuous passageway extending upwardly from below the lowermost partition, the lower of adjacent partitions being provided next internally of the casing with an upwardly projecting circumferential flange supporting the upper of said adjacent partitions.

2. In a heater, an upright metal casing which is circular in cross-section, several vertically spaced partitions arranged each in a substantially horizontal plane internally of the casing and transversely of the heater, a heating burner arranged under the lowermost partition, and a member supporting the lowermost partition and secured to the casing, said partitions forming internally of the casing a sinuous passageway extending upwardly from below the lowermost partition, each partition being circular to conform to the contour of the casing in cross-section, and the lower of adjacent partitions being provided next internally of the casing with an upwardly projecting annular circumferential flange provided at its upper end with a seat for the upper of said adjacent partitions.

3. In a heater, an upright metal casing which is circular in cross-section, several vertically spaced partitions arranged internally of the casing in a substantially horizontal plane and transversely of the heater, a heating burner arranged under the lowermost partition, and a member supporting the lowermost partition and secured to the casing, said partitions forming internally of the casing a sinuous passageway extending upwardly from below the lowermost partition, each partition being provided next internally of the casing with an upwardly projecting annular flange arranged concentrically relative to the casing, and the upper of adjacent partitions being removably mounted on the flange of the lower of said adjacent partitions.

4. In a heater, an upright metal casing which is circular in cross-section, several vertically spaced partitions having each a central opening, several vertically spaced partitions alternating with the first-mentioned partitions, and a heating burner under the lowermost partition, said partitions being each arranged internally of the casing in a substantially horizontal plane and transversely of the heater and circular to conform to the contour of the casing in cross-section, the lower of adjacent partitions being provided next internally of the casing with an upwardly projecting circumferential flange arranged concentrically relative to the casing, each partition being provided between its central portion and the surrounding casing with an annular downwardly offset portion which is arranged concentrically relative to the casing, the lowermost partition being one of the second-mentioned partitions and each of said second-mentioned partitions being provided with perforations between said annular downwardly offset portion and the aforesaid flange of said partition.

5. In a heater, the combination, with an upright casing, several vertically spaced partitions having each a central opening, several vertically spaced partitions having imperforate central portions and alternating with the first-mentioned partitions, and a heating burner under the lowermost partition, each partition being arranged internally of the casing in a substantially horizontal plane and transversely of the heater, the lowermost partition being one of the second-mentioned partitions, and the space between each of the first-mentioned partitions and the next lower partition being in communication adjacent the casing with the space next below said partition, of a laterally perforated upright tube interposed between the central portions of adjacent partitions.

6. In a heater, the combination, with an upright casing which is circular in cross-section, several vertically spaced partitions having each a central opening, several vertically spaced partitions having imperforate central portions and alternating with the first-mentioned partitions, and a heating burner under the lowermost partition, each partition being arranged internally of the casing in a substantially horizontal plane and transversely of the heater and provided between its central portion and the surrounding casing with two annular downwardly offset portions arranged concentrically relative to the casing, the lowermost partitions being one of the second-mentioned partitions, and the space between each of the first-mentioned partitions and the next lower partition being in communication adjacent the casing with the space next below said lower portion, of a laterally perforated upright tube seated on the inner downwardly offset portion of each of the second-mentioned partitions and having its upper end forming a seat for the next upper partition around the central opening in the last-mentioned partition.

7. In a heater, an upright casing, several vertically spaced partitions arranged in a substantially horizontal plane internally of the casing and transversely of the heater, and a laterally perforated upright tube interposed between the central portions of adjacent partitions, the upper of said adjacent partitions having a downwardly offset portion embracing the upper end of said tube, and said tube forming with the partitions a sinuous passageway internally of the casing and extending upwardly from below the lowermost partition.

8. In a heater, an upright casing, several vertically spaced partitions, a heating burner under the lowermost partition, and a laterally perforated tube interposed between the central portions of adjacent partitions, said tube forming with the partitions a sinuous passageway which is formed internally of the casing and extends upwardly from below the lowermost partition, the lower of the aforesaid adjacent partitions having an annular downwardly offset portion forming a seat for said tube.

9. In a heater, the combination, with an upright casing, vertically spaced partitions having each a central opening, other vertically spaced partitions having each an imperforate central portion and alternating with the first-mentioned partitions, and a heating burner under the lowermost partition, each partition being arranged internally of the casing in a substantially horizontal plane and transversely of the heater and provided with two spaced annular downwardly offset portions arranged concentrically relative to the casing, the lowermost partition being one of the second-mentioned partitions, and each of the second-mentioned partitions being perforated between its outer downwardly offset portion and the casing, of a laterally perforated upright tube interposed between adjacent partitions and embraced by the inner downwardly offset portion of the upper of said adjacent partitions and seated on the inner downwardly offset portion of the lower of said adjacent partitions.

In testimony whereof, I sign the foregoing specification, in the presence of two witnesses.

FRANCIS A. COTTIER, Jr.

Witnesses:
CASPER J. DORER,
B. C. BROWN.